Jan. 28, 1936.　　　　C. L. KENNEDY　　　　2,028,934
CONDENSER INDUCTION MOTOR

Filed April 19, 1930

Witness
Paul F. Bryant

Inventor
Carlton L. Kennedy
by Van Everen Fish
Hildreth Heary Attys.

Patented Jan. 28, 1936

2,028,934

UNITED STATES PATENT OFFICE 2,028,934

CONDENSER INDUCTION MOTOR

Carlton L. Kennedy, Braintree, Mass., assignor to The Holtzer-Cabot Electric Company, Roxbury, Mass., a corporation of Massachusetts Application April 19, 1930, Serial No. 445,609

12 Claims. (Cl. 172—233)

The present invention relates to condenser induction motors.

The object of the present invention is to provide a condenser induction motor having high starting torque and satisfactory operating conditions at running speeds.

In the usual condenser motor, having quadrature condenser and main windings, it is found that with a condenser of given size, there is a definite number of condenser winding turns which will produce a maximum starting torque, and that either an increase or a decrease in the condenser winding turns from this best value will result in a decrease in starting torque. The starting torque is therefore definitely limited by the capacitance of the condenser. The number of condenser winding turns for maximum starting torque is usually less than that required for resonance conditions, but in any case, is greater than can be allowed to remain in circuit under running conditions because of the additional voltage then induced in the condenser winding by the rotation of the rotor. In order to obtain a starting torque greater than that obtainable even under best conditions with the usual forms of condenser motors, the present invention makes use of a condenser winding having a moderate number of turns, together with means for inducing in the condenser circuit a voltage which is in phase with and additive to the line voltage. This induced voltage is preferably greater under starting conditions than when the motor is running and accordingly, the invention provides means whereby the connections may be changed when the motor gets up to speed to reduce the induced voltage in the condenser circuit.

Figure 1:
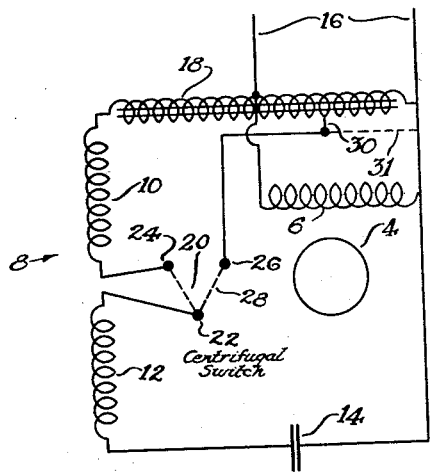
Figure 2:
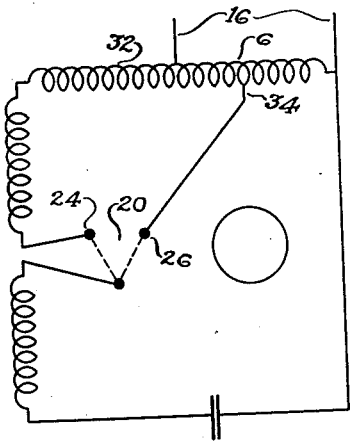
Figure 3:
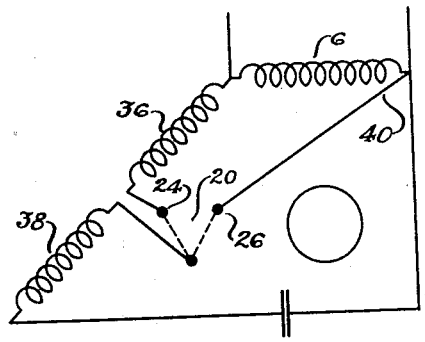

In the accompanying drawing, Fig. 1 is a diagram of one form of condenser induction motor embodying the features of the present invention; Fig. 2 is a diagram of a motor of simplified form having the same electrical characteristics as the motor of Fig. 1; and Fig. 3 is a diagram of a further simplified form of motor operating on the same principles.

The motor shown in Fig. 1 comprises a rotor 4 which may be of the usual squirrel cage type and a stator having wound thereon a line winding 6 and a set of condenser windings indicated generally at 8. The set of condenser windings is divided into two parts indicated as two windings 10 and 12. The windings 10 and 12 are preferably displaced 90° from the main winding 6. The condenser windings are connected in series with a condenser 14. The main winding 6 is adapted to be connected to the alternating current supply line 16. One side of the condenser circuit is directly connected to one end of the main winding. In order to induce in the condenser circuit a voltage additive to the line voltage, a transformer 18 is provided. This is preferably of the auto-transformer type, the line being connected to one end and a mediate point thereof. The transformer is a step up transformer, the condenser circuit being connected to include the full number of turns thereof.

A switch 20 is provided to change the connections for starting and running conditions. The switch has a fixed contact 22 and selector contacts 24 and 26, either of which latter is adapted to be connected with the contact 22 by means of a movable switch member 28.

At starting, the switch is connected between the contacts 22 and 24 so that both condenser windings are included in circuit and the maximum transformer voltage of the transformer 18 is impressed on the condenser circuit. The voltage impressed on the condenser circuit at starting is therefore the full voltage of the transformer 18 which is greater than the line voltage. This increased voltage in the condenser circuit increases the condenser current which current is considerably out of phase with the current in the main winding 6. Thus a considerable starting torque is produced. As the motor comes up to speed, the switch member 28 is moved to the contact 26 which connects with a point 30 of the transformer. The point 30 is so located as to impress a voltage on the condenser circuit. This voltage may be of any desired value but is preferably somewhat less than line voltage and for that reason, the connection 30 is placed between the connections of the line windings to the transformer. If desired, the connection may be made to the right-hand end of the transformer, so that the condenser circuit may be completely short-circuited on itself, as indicated by the dotted line 31. The switch 20 is preferably an automatic switch operated centrifugally as the motor comes up to speed, although a manual or other suitable switch may be employed, if desired.

The motor shown in Fig. 2 is electrically identical with that of Fig. 1, but differs in construction in that the main winding 6 and an extension 32 of the main winding are employed in place of the transformer 18. The portion 6 of the main winding which is connected between the line 16 is the same as the main winding 6 of Fig. 1. The extension 32 is a transformer winding which is wound on the stator in the same phase as the winding 6. The condenser windings, the rotor, and the switch 20 are identical with the corresponding parts of Fig. 1. The running switch contact 26 is connected at 34 to a mediate point of the winding 6. In operation, a voltage is induced in the winding 32 which is additive to the line voltage. This induced voltage, except for the effect due to a small resistance and leakage reactance drop, is in phase with the line voltage. The combined line voltage and induced voltage is impressed on the condenser circuit during starting. When the motor comes up to speed, the switch is turned to the running connection, thereby permitting operation under the same electrical conditions as exist in the motor of Fig. 1.

The motor of Fig. 2 offers the advantage that it avoids the use of a separate transformer. On the other hand, the motor of Fig. 1 possesses some advantages in that the space afforded on the stator for the windings is not required to be used for a transformer winding which is inactive at all times except at starting, and moreover, the main winding is not required to be of sufficient size to carry the energy delivered to the condenser circuit by induction as is the case with the motor of Fig. 2. Either motor operates to give a satisfactory high starting torque and balanced running conditions. In addition, either motor possesses the desirable feature of permitting rotation in either direction. A change in the direction of rotation is easily effected by merely reversing the polarities of the condenser windings.

A still further simplified construction is shown in Fig. 3 in which the condenser windings are arranged at such an angle as to induce therein a voltage which is additive to the line voltage. The main winding 6 is identical with the main windings in the above described construction. The condenser windings 36 and 38 are displaced from the main winding by an angle differing from 90°. As before, the switch 20 is provided for shifting from starting to running connections. The windings 36 and 38 together take the place of the extended main winding 32 and the condenser windings of the construction of Fig. 2. By virtue of the displacement of the condenser windings, there is induced therein at starting a voltage which is proportional to the turns ratio of the main and condenser windings multiplied by the cosine of the angle of displacement. This transformer voltage is always in phase with an additive to the line voltage. In order to make the starting conditions identical with those of the motor of Fig. 2, the combined number of turns in the windings 36 and 38 should equal the square root of the sum of the squares of the turns in the extended main winding 32 and the combined condenser windings 10 and 12 of the motor of Fig. 2, and the tangent of the angle of displacement should be the ratio of the combined number of turns in the condenser windings to the number of turns in the extended main winding. The windings 36 and 38 are not required to be displaced from the main winding by the same angle but this is to be preferred for the sake of convenience in laying the windings in the slots. Under running conditions with the switch on contact 26, the winding 38 has induced therein not only a voltage due to the rotation of the rotor, which is out of phase with the line voltage by an angle equal to the angle of displacement between the windings, but also another voltage existing at all times by transformer action, which is in phase with the line voltage. In view of the voltage induced by transformer action which exists even under running conditions, the connection from the switch contact 26 preferably runs to the end of the main winding 6 as indicated at 40. Thus, the entire condenser circuit is closed upon itself, the transformer voltage induced in the condenser winding 38 taking the place of the voltage impressed on the condenser circuit by the mediate connection 30 or 34 of either of the constructions shown in Figs. 1 and 2.

The motor of Fig. 3 commends itself because of its simplicity and the fewer number of turns required for satisfactory operation as compared with the motors previously described. It will be noted, however, that this motor is not adapted for reversal of rotation and where a motor must be operated in either of two directions, the construction of Fig. 1 or Fig. 2 is to be preferred.

It will be seen that in any form of the invention, the additive transformer voltage introduced into the condenser circuit permits a sufficient flow of quadrature current to afford a satisfactory starting torque. In the ordinary condenser motor, the condenser current is small at starting, and although it may be increased by increasing the turns of the condenser winding to partially neutralize the condenser reactance, there is a limit beyond which a further increase of turns is not effective to increase the starting torque, but rather actually reduces it. According to the present invention, the starting torque is not thus limited, and may be made to exceed that obtainable with the ordinary motor, even when the latter is operated with the most satisfactory number of condenser winding turns.

Having thus described the invention, what is claimed is:

1. A condenser induction motor having, in combination, a rotor, main and condenser stator windings, a condenser circuit including the condenser winding and a condenser in series therewith, means for inducing in the condenser circuit a component of voltage in phase with the line voltage, and switching means for cutting a part of the condenser winding out of circuit and simultaneously decreasing said voltage component in the condenser circuit under running conditions.

2. A condenser induction motor having, in combination, a rotor, main and condenser stator windings, a condenser circuit including the condenser winding and a condenser in series therewith, transformer means for impressing on the condenser circuit a voltage in phase with and additive to the line voltage, and switching means for simultaneously cutting a part of the condenser winding out of circuit and for decreasing the magnitude of the voltage induced in the condenser circuit.

3. A condenser induction motor having, in combination, a rotor, main and condenser stator windings, a condenser circuit including the condenser winding and a condenser in series therewith, the condenser winding being displaced from the main winding by an angle differing from 90° to induce in the condenser circuit a voltage in phase with the line voltage, and switching means for cutting a part of the condenser winding out of circuit under running conditions.

4. A condenser induction motor having, in combination, a rotor, main and condenser stator windings, a condenser circuit including the condenser winding and a condenser in series therewith, the condenser winding being displaced from the main winding by an angle differing from 90° to induce in the condenser circuit a voltage in phase with the line voltage, and switching means to vary the magnitude of the voltage thus induced in the condenser circuit.

5. A condenser induction motor having, in combination, a rotor, main and condenser stator windings, a condenser circuit including the condenser winding and a condenser in series therewith, the condenser winding being displaced from the main winding by an angle differing from 90° to induce in the condenser circuit a voltage in phase with the line voltage, and switching means to reduce the magnitude of the voltage thus induced in the condenser circuit under running conditions.

6. A condenser induction motor having, in combination, a rotor, main and condenser stator windings, a condenser circuit including the condenser winding and a condenser in series therewith, the condenser winding being displaced from the main winding by an angle differing from 90° to induce in the condenser circuit a voltage in phase with the line voltage, and switching means for cutting a part of the condenser winding out of circuit and for decreasing the voltage induced in the condenser circuit.

7. A single phase motor having main and starting primary windings and a secondary winding inductively and rotatively related to said primary windings, a condenser, means for connecting said condenser and starting winding in series, and in parallel with the main winding for starting purposes and connecting the starting winding and condenser in a tertiary circuit conductively segregated from the main winding for running purposes.

8. A single phase motor comprising main and starting primary windings, a secondary winding inductively and rotatively associated with the primary windings, a condenser, and a two way switch, said condenser being permanently connected between one end of the starting winding and said switch, said switch having contacts for alternately connecting the condenser and starting winding in parallel with the main winding and connecting the condenser across a portion of said starting winding conductively segregated from the main winding.

9. A single phase motor having a stator, a main winding on said stator, an induction rotor associated with said stator, a second winding on said stator displaced at an angle to said main winding, and a condenser permanently connected with said second winding and connections for alternately employing said second winding and condenser as a primary winding circuit in parallel with the main winding for starting the motor and as a tertiary condenser circuit inductively connected to the main winding through the secondary for improving the power factor of the motor during running.

10. A single phase motor having main and starting primary windings, an induction secondary winding inductively and rotatively associated with said primary windings, a condenser, a single phase source of supply, and means for connecting the condenser and starting winding in series and in parallel to the main winding and source of supply for starting purposes and connecting a portion of the starting winding and condenser in a tertiary circuit conductively segregated from the main winding and line for running purposes.

11. A condenser induction motor having, in combination, a rotor, a plurality of windings including a stator main winding to be connected to a source of voltage and a stator condenser winding, a condenser circuit including the condenser winding and a condenser, one of the windings having induced therein a voltage component in phase with the voltage source, connections to impress said induced voltage in the condenser circuit at starting, and switching means for simultaneously cutting a part of the condenser winding out of circuit and decreasing the magnitude of said voltage component under running conditions.

12. A condenser induction motor having, in combination, a rotor, main and condenser stator windings, a condenser circuit including the condenser winding and a condenser in series therewith, transformer means including an extension of the main winding for impressing on the condenser circuit a voltage in phase with and additive to the line voltage, and switching means for simultaneously cutting a part of the condenser winding out of circuit and for decreasing the magnitude of the voltage induced in the condenser circuit.

CARLTON L. KENNEDY.